G. A. MEAD.
METHOD OF BONDING RAILS.
APPLICATION FILED JUNE 21, 1916.
1,209,742.
Patented Dec. 26, 1916.
2 SHEETS—SHEET 1.
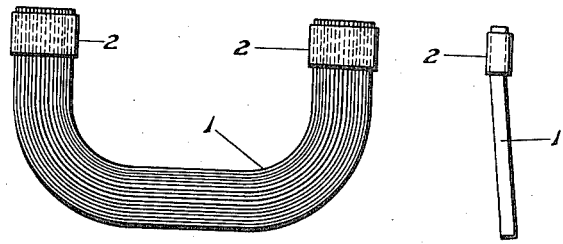
Fig. 1
Fig. 2
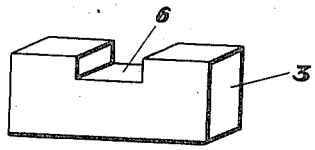
Fig. 5
Fig. 4
Fig. 3
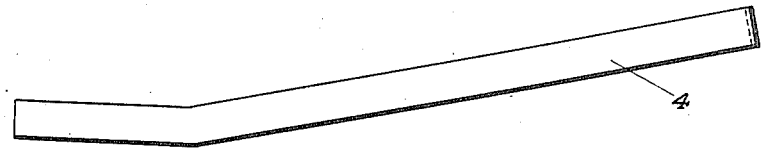
Fig. 6
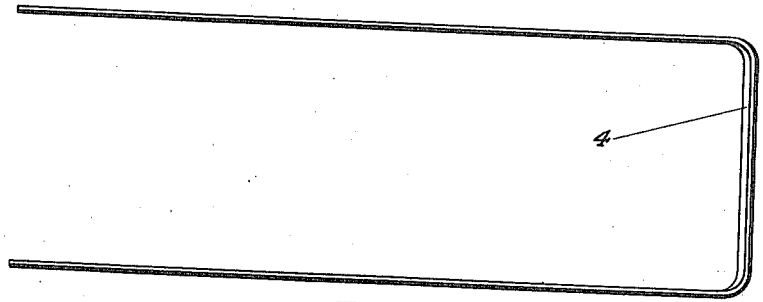
Fig. 7
Witnesses
Lewis H. Miller
Leo J. Madden
Inventor
George A. Mead
By Brown, Nissen, Sprinkle
Attorneys

G. A. MEAD.
METHOD OF BONDING RAILS.
APPLICATION FILED JUNE 21, 1916.

1,209,742.

Patented Dec. 26, 1916.
2 SHEETS—SHEET 2.

UNITED STATES PATENT OFFICE.

GEORGE A. MEAD, OF MANSFIELD, OHIO, ASSIGNOR TO THE OHIO BRASS COMPANY, OF MANSFIELD, OHIO, A CORPORATION OF NEW JERSEY.

METHOD OF BONDING RAILS.

1,209,742. Specification of Letters Patent. Patented Dec. 26, 1916.

Application filed June 21, 1916. Serial No. 104,853.

*To all whom it may concern:*

Be it known that I, GEORGE A. MEAD, a citizen of the United States, residing at Mansfield, in the county of Richland and State of Ohio, have invented certain new and useful Improvements in Methods of Bonding Rails, of which the following is a specification.

My invention relates to improvements in the method of bonding railway rails and producing electrical joints.

One object of my invention is to produce a method of bonding which is cheap, practical and easy of application.

Another object is to produce a method by means of which it is possible to attach the bonds in such a manner as to form an integral union between the bond and the rail.

Another object is to apply the bond in such a manner as to give high efficiency of contact both electrically and mechanically.

Another object is to produce a method which will permit the use of a bond having an exceedingly small amount of metal in its terminals.

Another object of my invention is to produce a method of bonding which will permit the use of a bond which will be difficult to remove from the rail when installed.

With these and other objects in mind, which will be disclosed later, my invention consists in the novel construction, arrangement and combination of the various parts hereinafter more fully described and claimed.

Figure 8:
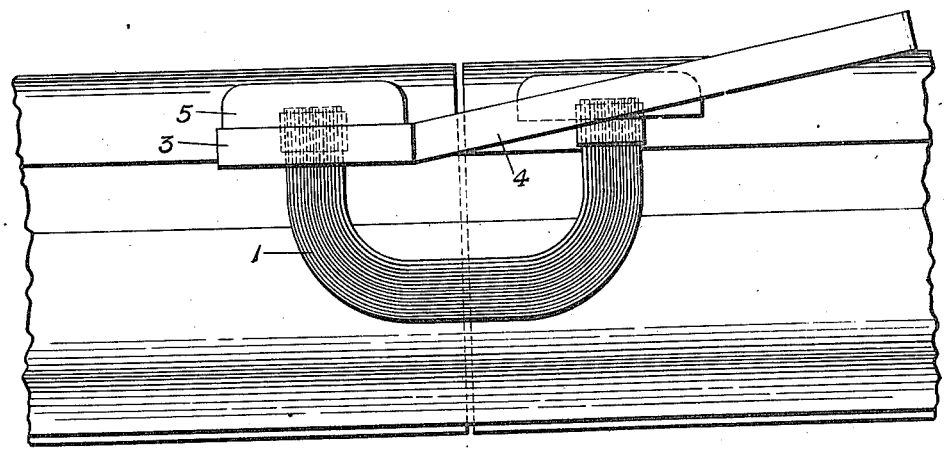
Figure 10:
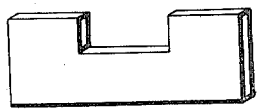
Figure 11:
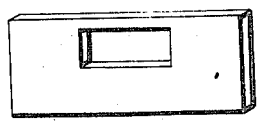
Figure 9:
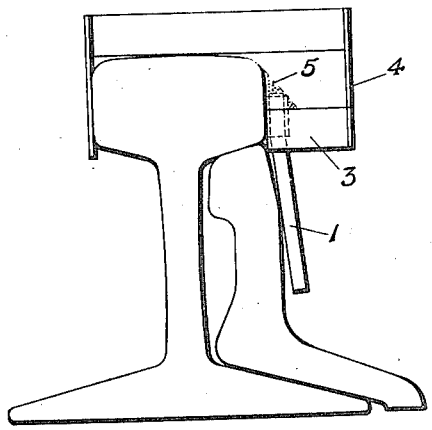

The description of the drawings and invention is as follows:

Figure 1 is a side elevation of the bond I have found practical, economical and cheap to use with my process. Fig. 2 is an end elevation taken at right angles to Fig. 1. Fig. 3 is a side elevation of the sleeve which is attached to each end of the bond. Fig. 4 is a top plan view of the sleeve shown in Fig. 3. Fig. 5 is a perspective view of the refractory block used in the application of the bond. Figs. 6 and 7 are elevation and plan views respectively of one form of clamp which can be used in holding the parts in assembled position on the rail. Fig. 8 is a side elevation of two rails abutting, showing the location of a bond and manner of attachment to the rail. Fig. 9 is an end elevation taken at right angles to Fig. 8 and shows the assembled arrangement of parts just after completing a union between the rail and bond. Figs. 10 and 11 are perspective views of a substitute for the device in Fig. 5 and made of metal.

I have shown in Figs. 1, 2, 3, 4, 10, and 11, a form of bond which I have found well adapted to my method of bonding but which I have not claimed in this application as same is claimed in a pending application Serial No. 101,419, filed June 2, 1916.

The bond I show in Figs. 1, 2, 3, and 4, consists of a body, 1, having compressed thereon or otherwise attached, a sleeve, 2, either entire or split, made preferably of iron, steel, and alloy high in iron or other ferrous forms of metal or nickel alloy such as Monel metal and I allow the ends of the body to extend through the sleeve slightly unless the end of the sleeve is made closed. The body, 1, is preferably made of laminated ribbon or a plurality of wires formed into a cable and I prefer to leave the ends of the body unwelded although they can be welded into solid ends if desired. My reason for using this form of bond is that the welding-metal has a greater affinity for the iron, steel, ferrous or nickel alloys than for copper which is usually used in the body and terminals of bonds, and for this reason the welding-metal which surrounds the end of the bond forms a strong attachment to the sleeve which is in turn strongly attached to the bond and strengthens materially the union between the body and the welding-metal; another advantage in sleeves of a ferrous or nickel nature is that their melting point is higher than that of copper and the copper within the sleeve is therefore better protected than if copper were used in the sleeves or a metal of lower melting point than copper.

I use in my method of bonding a welding-metal of copper, phosphor-copper, or any of the phosphor bronzes preferably high in copper and lower in tin and phosphorus.

The heat I use for bringing the rail surface up to the melting point or near such temperature, and also the bond end and sleeve, is that of the oxy-acetylene flame or other similar gas flame or the electric arc.

These give a very intense, concentrated heat of about 6000° F. and while it heats only a very limited area at one time, it does so very quickly.

It is the usual practice when bonding by the oxy-acetylene flame or electric arc to use a bond having a large terminal which makes the bond expensive, as the terminals are usually of copper, but with my method it is not necessary to use a large terminal or in fact anything that could be called a terminal, nor is it necessary to use a mold having a cavity in which the molten welding-metal is formed but I use instead a block, which I term a shelf, preferably flat and made of a heat resisting material, preferably carbon. This block I channel or slot to fit the bond as shown by numeral 6 in Fig. 5. The shelf can be made detachable and of iron or nickel or their alloys and of suitable size, Figs. 10 and 11, in which case it forms a part of the final joint and is non-removable after welding.

The shelf extending outward and around the bond terminal, protects that part of the body below the shelf from the heating flame.

The bond and shelf assembled to the rail are shown in Figs. 8 and 9, the shelf being shown by numeral 3. In order to hold the parts in position I use a spring clamp shown in Figs. 6 and 7 and represented by numeral 4 in Figs. 8 and 9.

It will be observed and readily seen from Figs. 8 and 9 that if only a limited contact is required between the rail and welding-metal, it will not be necessary to use the shelf 3, but merely place the bond end against the rail and apply the welding metal to the bond end as previously described, in which case the upper face of the bond performs the same function as the shelf surrounding the bond.

Numeral 5, Figs. 8 and 9, represents the welding-metal. The right hand terminal (Fig. 8) shows the work completed and the shelf removed; the left hand terminal shows the work completed but the shelf and clamp still in place.

To apply my method the bond and shelf are placed in position as shown in Fig. 8 and the end of the bond and rail surface are brought quickly up to the melting point or very close thereto, by the oxy-acetylene flame and as soon as the proper temperature is attained I apply the welding-metal to that point in the form of a small rod or wire, which is quickly melted down and unites with the rail and bond. This process is repeated at an adjacent point and so on until the whole end of the bond is covered by welding-metal as well as the adjacent surface of the rail, the process being carried out in what I term progressive increments.

The force of the flame causes the molten metal to flow and the operator can therefore, build up the terminal in any shape desired and very quickly. The shelf being non-metallic the welding-metal does not stick to it and it can be removed and used over and over again.

By my method it can be readily seen that I unite the ends of the bond body to the welding-metal which is of high conductivity electrically and strong mechanically, and the attachment of the bond end to the welding-metal is strengthened by the steel or iron sleeve, 2, extending into and uniting with the welding.

A preferred form of the welding-metal is that of a triangular cross section having the base below and the apex above and next the rail which produces a sloping face to the welding-metal, thereby preventing horses hoofs, wagon wheels, and other forces from tearing the bond from the rail.

A bond made and applied as I have just explained will be found to be strongly united to the rail and very difficult to pry off by a thief and of little value to him on account of the small amount of copper he will secure and the fact that iron or steel will be removed with the bond which will reduce the value of the bond.

In applying bonds by my method I have observed and found true that it is not necessary to have the rail surface, steel sleeve or collar and the bond body in a fused or molten condition when applying the welding or attaching-metal in order to securely attach the bond to the rail and carry out my invention, but if the parts are close to the melting point of the attaching or welding-metal, it is sufficient for my purpose.

I have shown herein and described the preferred construction, but I do not wish to be limited to such precise construction or application shown and described as modifications may readily be made herein without departing from the spirit of my invention.

Having described my invention, what I claim as new and novel and desire to secure by Letters Patent is:—

1. A method of bonding rails consisting in applying to the rail-end a shelf of heat resisting material, passing the end of a rail bond composed of a body encircled by a sleeve of ferrous material through a slot in the shelf and allowing the end of the bond body and collar to extend above the shelf, applying heat produced by a gas flame to the ends of the bond body and sleeve and to the adjacent rail surface until proper temperature is reached, and applying attaching-metal to the area thus heated, repeating the heating and application of attaching-metal until the bond is secured to the rail as described, and removing the shelf.

2. A method of bonding rails consisting in applying to the rail-end a shelf of heat resisting material, passing the end of a rail bond composed of a body encircled by a sleeve of ferrous material through a slot in the shelf and allowing the end of the bond body and sleeve to extend above the shelf, applying a means of heat to the ends of the bond body and to the adjacent rail surface until proper temperature is reached, and applying attaching-metal sufficient to efficiently apply the body to the rail, and then removing the shelf.

3. A method of bonding rails consisting in applying to the rail-end a shelf, passing the end of a rail bond composed of a body encircled by a sleeve having a higher melting point than the body through a passage in the shelf and beyond its surface, applying a heating-flame to the end of the bond body, the sleeve and the adjacent rail surface until a temperature sufficient is reached, applying attaching - metal sufficient to the bond end and rail, uniting the bond to the rail.

4. A method of bonding rails consisting in applying to the rail end a shelf, passing the end of a rail bond through a passage in the shelf and above its surface, applying heat to the bond-end and adjacent rail surface and applying attaching-metal to the heated area thereby forming an integral attachment between the bond and rail.

5. The method of applying bonds to rail ends consisting in arranging the bond end having a sleeve with a higher melting point than the body body in juxtaposition to the rail surface, applying a heating flame to the bond end and adjacent rail surface, and applying attaching metal to the face of the bond end and the adjacent rail surface.

6. A method of bonding rails consisting in applying to the rail end a shelf, passing the end of a bond through the shelf and above its surface, applying a heating flame to the bond end and adjacent rail surface and applying attaching-metal thereto and inclosing the end, face, and adjacent side faces of the bond.

7. The method of applying bonds to rail-ends consisting in arranging the bond end having a ferrous collar in juxtaposition to the rail surface, applying a heating flame produced by combustion of gases to the bond-end and adjacent rail surface and applying attaching-metal to the face of the bond end and rail.

8. The method of applying bonds to rail-ends consisting in arranging the bond end having a ferrous collar in juxtaposition to the rail surface, applying a heating flame to the bond end and adjacent rail surface and applying attaching-metal of bronze to the bond end and rail, integrally uniting the bond to the rail.

9. The method of bonding rails consisting in arranging the bond end having a sleeve with a higher melting point than the bond body and the rail surface in juxtaposition, applying a heating flame to the bond and rail and applying an attaching-metal in progressive increments to the face of the bond end, its adjacent side faces and to the adjacent rail surface, thereby embedding the bond end in the attaching metal and integrally uniting the bond to the rail.

10. A method of making electrical joints consisting in forming up a bond body of a plurality of members and encircling the ends of the body by a sleeve having a higher melting point than the bond body, placing the end of the bond and rail in juxta-position, applying heat to the end face of the body, the end face and adjacent sides of the sleeve, and the adjacent rail surface and applying attaching-metal to the heated parts.

11. The method of welding bonds to rails consisting in placing the rail and bond-end in juxta-position, placing a shelf about the bond end upon which the attaching metal can be formed and in applying attaching metal to the shelf and to the adjacent rail surface in progressive increments.

12. The method of bonding rails consisting in positioning on the rail end a bond having a body composed of a plurality of members having the ends encircled by a sleeve, applying to the rail end a shelf which projects from the sleeve, heating the end of the bond and adjacent rail by means of a flame, and applying attaching-metal to the bond end, the projecting means, and the rail to integrally unite the bond end to the rail.

13. The method of bonding rails consisting in positioning a shelf against the rail, placing the bond in position with respect to the rail and shelf, applying a heating flame to the rail and bond end, and applying attaching-metal to the heated parts to integrally unite the bond end to the rail.

14. The method of bonding rails consisting in arranging the bond end encircled by a collar of ferrous metal and the rail in juxta-position, applying a heating flame to the bond end and adjacent rail surface and applying attaching-metal to the heated parts to form a sloping surface downwardly and outwardly from the rail.

15. A method of bonding rails consisting in arranging the bond end encircled by a collar of ferrous metal and the rail-end in juxta-position, applying a heating flame to the bond end and adjacent rail surface and applying attaching-metal of a lower melting point than that of the bond body to the heated parts to integrally unite the bond to the rail.

16. A method of bonding rails comprising the combination of a rail and a bond formed of a plurality of members having the ends encircled by a sleeve of a higher melting point than the body and uniting the rail and bond by heating the rail and bond end and applying an attaching-metal having a lower melting point than the bond body.

17. A method of bonding rails consisting in applying to the rail-end a bond composed of a body encircled by a sleeve having a higher melting point than that of the bond body, applying a heating-flame to the end of the bond, and applying to the heated parts an attaching-metal having a lower melting point than that of the sleeve, thereby uniting the bond and rail integrally together.

18. A method of bonding rails consisting in applying to the rail a bond composed of a body encircled by a sleeve having a higher melting point than the body and provided with a metallic shelf and having the end of the sleeve and body extending above the shelf, applying a heating flame to the bond end, the sleeve, the shelf and the rail, then applying attaching-metal to the parts heated, thereby forming an integral union.

19. The method of bonding rails consisting in placing the rail and the bond end which is encircled by a sleeve having a higher melting point than the bond body in juxta-position, applying a heating flame to the bond end and adjacent rail surface, and applying attaching-metal to the heated parts integrally uniting the bond to the rail.

20. The method of bonding rails consisting in positioning on the rail a bond provided with a sleeve encircling its attaching end, and with metallic means encircling the sleeve and projecting from the rail, in applying a heating flame to the positioned parts and then applying attaching-metal to such parts.

21. The method of bonding rails consisting in positioning on the rail a bond comprising a body, a sleeve encircling the end of the body and a shelf surrounding the sleeve, applying a heating flame to the rail and the positioned bond and applying attaching-metal to integrally unite the bond to the rail.

22. The method of bonding rails consisting of applying to the rail the end of a bond, in positioning a shelf of heat-resisting material against the rail and the bond end, applying a heating flame to the parts to be united, and applying attaching-metal to the heated parts to integrally unite the bond end to the rail, and in then removing the shelf.

23. The method of bonding rails consisting in applying to the rail a slotted refractory shelf, in positioning a bond end in the slot in the shelf against the rail, heating the parts and applying attaching-metal to form an integral union between the rail and the bond end, and in then removing the shelf.

24. The method of bonding rails consisting in applying a bond terminal having a ferrous collar in juxta-position to the rail surface, in positioning a heat-resisting shelf against the rail adjacent the bond terminal, in applying a heating flame to the parts, in then applying attaching metal to form an integral union between the rail and bond terminal, and in then removing the shelf.

25. The method of bonding rails consisting in applying a bond terminal encircled by a ferrous sleeve to the rail surface, in positioning a shelf of refractory material against the bond end and the rail, in heating the parts, and in applying an attaching metal to form an integral union between the rail and the bond terminal, and in then removing the shelf.

26. The method of bonding rails consisting in applying to the rail a refractory shelf having a flat top, in positioning a bond end encircled by a ferrous sleeve adjacent the rail and the shelf, in heating the parts and applying attaching metal above the shelf to form an integral union between the rail and bond end, and in then removing the shelf In testimony whereof I have signed my name to this specification, on this 16th day of June, A. D. 1916.

GEORGE A. MEAD.